Patented Aug. 31, 1943

2,328,250

UNITED STATES PATENT OFFICE 2,328,250

BARIUM SULPHATE PIGMENTS AND PROCESS FOR PREPARING THEM

Ladislaus Balassa, Flint, Mich., assignor to E. I. du Pont de Nemours & Company, Wilmington, Del., a corporation of Delaware No Drawing. Application July 26, 1940, Serial No. 347,784

12 Claims. (Cl. 260—40)

This invention relates to calcined barium sulphate pigments and more particularly to a method of calcination of natural, crude barytes.

Barium sulphate pigments, both the natural barytes and the synthetic blanc fixe, have been extensively used in the past in coating compositions. Barytes is usually considered unsatisfactory as a pigment because it is coarse and very hard to grind sufficiently to obtain a smooth textured coating. It also tends to flocculate in the most commonly used vehicles. On the other hand blanc fixe, while usually obtainable in a very small particle size, which is relatively easy to disperse in vehicles, is more hydrophyllic than barytes and also frequently contains sufficient quantities of water soluble salts to adversely influence the durability of the paint, in which it is used as a pigment. In addition blanc fixe is, as a rule, more than four times as expensive as barytes.

I have found that when natural barytes is calcined at a specific temperature or within a specific temperature range, the above disadvantages are either overcome entirely or greatly reduced so that it is entirely satisfactory as a pigment.

This invention has as an object to provide a method of treating inexpensive natural barium sulphate to make it more suitable for use as a pigment in oleo-resinous or synthetic resin vehicles.

It is also an object of this invention to prepare barium sulphate pigments which will yield films of increased strength and hardness.

A further object is to prepare barium sulphate pigments which, when incorporated in paint films, offer a greater resistance against the penetration of moisture through the films than is the case with blanc fixe.

A still further object is to prepare low cost barium sulphate pigments which are wetted more readily with organic liquids.

Other objects will appear as the description of the invention proceeds.

These objects are accomplished by heating, under certain conditions, natural barium sulphate to a temperature between 1100° C. and 1300° C., depending upon the properties required and the impurities present. The invention will be more apparent from the examples given below by way of illustration.

I have found that natural barium sulphate minerals, commonly known as barytes, baryte, barite or heavy-spar consisting mainly of $BaSO_4$, are suitable for treatment according to my invention.

Due to variations in the physical properties and the impurities which they may contain, it is impossible to set inflexible limitations with respect to time-temperature schedules which will result in a pigment having the exact characteristics desired. However, these will be apparent from the following description.

I have found that a temperature of around 1100° C. is necessary to effect a desirable change in some grades of barytes while to obtain a similar change in others a temperature of 1250° C. is necessary. These temperatures, however, may be increased to 1300° C., or even higher, for a short time with the result that pigments having most of the properties aimed at by my invention will be obtained, but when such high temperatures are used, difficulty is encountered with respect to sintering. Therefore, the preferred temperature range lies between 1100° C. and 1250° C.

The calcination of the raw barytes may be carried out in conventional kilns which may be of the stationary or rotary type. It is to be understood, however, that in making pigments of this type contamination by smoke from a coal or oil fire is to be avoided. The following example illustrates a suitable procedure with respect to time and temperature for the calcination of barytes:

EXAMPLE 1

In a ceramic kiln clay pots holding about 10 pounds of barytes are heated gradually within a 20-hour cycle up to 1250° C. The temperature is held for four hours at 1250° C. The calcined barytes is then discharged and subjected to grinding and other treatment such as is customary in preparation of pigments.

The above calcination resulted in an at least partial break-down of the particles of barytes which were then wetted more readily with oils and other organic liquids. These changes are made obvious by the fact that the barytes has increased in oil absorption approximately 10% by the Gardner-Coleman oil absorption test. This test is carried out as follows: 20 grams of pigment is weighed into a 400 cc. beaker. The oil is dropped in from a 50 cc. burette. To start, 5 drops of oil are deposited in one spot and then the beaker is tilted and very slowly turned in the hands of the operator so as to form a ball of oil saturated pigment. From then on, about three drops are deposited on the ball at a time; then the beaker is revolved so the dry pigment will roll over the wet ball and adhere to it. The end point is reached when no dry pigment is left on the bottom and sides of the beaker, but is all held in a firm ball and with no excess oil present.

The oil absorption value is calculated by inserting the appropriate data in the following formula:

$$\frac{100 \times \text{burette reading in cc.}}{\text{Sample weight in grams}}$$

The calcined barytes also holds the oil as a firm ball in the above oil absorption test while the ball formed by the raw barytes flattens out rapidly.

Impurities, especially iron oxides, that frequently occur in combination with barytes, if present during the calcination, cause the calcined pigment to take on the color of the impurity present. Such impurities also increase the opacity of the calcined pigments very substantially.

In order to obtain a white pigment by my invention it is necessary to use a crude barytes which occurs either free of colored impurities or from which the impurities have been extracted or washed by steam-boiling with sulphuric acid or by other means known to the art.

In the above description of the first phase of my invention, I have illustrated how crude barytes may be converted into pigments which produce high-grade paints at low cost. Paints so produced show increased resistance against moisture penetration, have a smoother surface texture, a more rapid drying rate and have better suspending properties.

The vehicles suitable for pigmentation with calcined barytes may be those of the drying oil type with or without natural or synthetic resins. The pigment combination, however, should for best results contain calcined barytes as above prepared in excess of 30% of the total pigment combination. The ratio of pigment to binder should be adjusted to yield the most satisfactory compromise between maximum speed of dry, flexibility and film toughness. This adjustment will be readily apparent to those skilled in the art.

The following examples of typical compositions are included by way of illustration and not as a limitation:

Example 2

*Gray primer-surfacer*

| | Parts by weight |
|---|---|
| Resin A solution | 24.2 |
| Pyrophyllite | 20.0 |
| Calcined barytes | 30.0 |
| Titanium dioxide | 10.0 |
| High solvency petroleum naphtha | 15.4 |
| Lead naphthenate solution (16% Pb) | .2 |
| Manganese naphthenate solution (3% Mn) | .2 |
| | 100.0 |

Resin A solution used in Example 2 was prepared from the following ingredients using the proportions indicated:

| | Parts by weight |
|---|---|
| Phthalic anhydride | 19.99 |
| Glycerol | 8.72 |
| Litharge | .03 |
| Linseed oil | 28.74 |
| High solvency petroleum naphtha | 42.52 |
| | 100.00 |

Example 3

*Dipping primer*

| | Parts by weight |
|---|---|
| Varnish "A" | 60.0 |
| Calcined barytes | 24.0 |
| Lamp black | 6.0 |
| Oleoum spirits | 10.0 |
| | 100.0 |

Varnish "A" was formed from the following ingredients using the proportions indicated:

| | Parts by weight |
|---|---|
| Rosin | 14.98 |
| Calcium hydrate | .60 |
| Tung oil | 35.21 |
| Mineral spirits | 49.21 |
| | 100.00 |

The coating compositions set forth above, as well as other coating compositions falling within the scope of the present invention, are prepared by grinding or dispersing the pigment combinations with the resin or varnish in the presence of sufficient solvent to provide a consistency suited to the dispersing device used. After dispersion, the paint is reduced to application consistency with additional solvent. The driers may be added at any desired point in the preparation of the coating composition.

Where desired, extenders or prime pigments such as silica, abestine, whiting, lead chromate, zinc chromate, white lead, etc., may be incorporated in the coating compositions falling within the scope of the present invention.

The use of zinc oxides, litharge, red lead, basic calcium silicates, calcium aluminates or other basic pigments in combination with calcined barytes falls within the scope of this invention.

Resin A, the oil modified polyhydric-alcohol polybasic-acid resin or resins of this general type may be made in any well-known manner as for example, by heating the ingredients at any suitable temperature above the melting point of the materials until resinification is complete. If desired, refluxing or partial refluxing may be resorted to or the operation may be carried out at elevated or reduced pressures.

In general it is advisable to maintain the acid number of the resin at the lowest possible value and this is usually accomplished by increasing the temperature or the period of heating, but stopping before the gel point is reached. The allowable range of acid numbers will vary with the type of pigment used. With chemically active pigments, like zinc oxide or basic carbonate white lead, the acid number should preferably be below 20. With chemically inert pigments, the question of acid number is not as important.

Varnish "A" referred to above, or other oleoresinous vehicles of the same type, may be made by any manner known to the art; for example, by heating the ingredients at any suitable temperature above the melting point of the ingredients until a homogeneous product of the desired dry and physical properties is obtained.

The term "resin" is used herein to include a natural resin, like rosin, Congo, East India, damar, etc., or a synthetic or semi-synthetic resinous product like Bakelite, indene, amberol, chlorinated rubber, cellulose esters and ethers, etc. The term "oil" includes drying oils, semi-drying oils, synthetic drying oils and plasticizers of an oily nature.

By the term "modified alkyd resin" as used herein, I mean the resinous condensation product resulting from the reaction of one or more polyhydric alcohols and one or more polybasic acids with one or more of the following modifying ingredients: drying oils, semi-drying oils, synthetic drying oils and monobasic acids, especially those derived from drying oils and semi-drying oils and mixtures of one or more of these modifying ingredients with natural or synthetic resins or other equivalent products.

The term "calcined barytes" is used herein to include a group of compounds having as their main component barium sulphate with or without colored impurities. These compounds are obtained from a mineral, usually named as barytes, barite, baryte or heavy-spar, by calcination at or above a temperature that is sufficient to effect such changes in the structure of the mineral which result in an increased oil absorption and in general improved pigment properties, but below a temperature which is sufficient to cause a chemical decomposition of the product. I found that calcination temperatures between 1100° C. and 1300° C. produce pigments with the optimum properties.

The advantages which flow from the use of the herein described pigments are that they are more easily wetted by organic liquids used in paints; consequently they are more easily dispersed in the common vehicles; they also offer greater resistance against the penetration of moisture.

It is apparent that many widely different embodiments of this invention may be made without departing from the spirit and scope thereof, and therefore, it is not intended to be limited except as indicated in the appended claims.

I claim:

1. The process of preparing pigments from naturally occurring barytes which comprises heating the same without further addition of chemicals at a temperature between 1100° C. and 1300° C. until the oil absorption has increased about 10%.

2. The process of claim 1 in which the pigment is heated gradually to a temperature of 1250° C. which temperature is maintained for about 4 hours and then gradually cooled.

3. The process of preparing pigments which comprises dehydrating natural barytes by heating gradually until a temperature of 1250° C. is reached, maintaining such temperature for about 4 hours, and thereafter slowly cooling the dehydrated barytes, the time from the beginning of heating until the material is again at room temperature being about 20 hours.

4. A coating composition comprising calcined natural barytes which has been heated at a temperature between 1100° C. and 1300° C. for at least 4 hours.

5. The composition of claim 4 in which the barytes has been heated until an increase in oil absorption of at least 10% has been obtained.

6. The composition of claim 4 in which the binder contains an oil having drying properties.

7. The composition of claim 4 in which the binder contains an oil and a resin.

8. The composition of claim 4 in which the binder contains an oil and an alkyd resin having an acid number below 20.

9. A coating composition having substantially the following composition:

| | |
|---|---|
| Alkyd resin (about a 58% solution) | 24.2 |
| Pigment | 30.0 |
| Calcined barytes prepared according to claim 3 | 30.0 |
| Solvent | 15.4 |
| Drier | .4 |

10. A pigment consisting of natural barytes which has been heated at a temperature between 1100° C. and 1300° C. until the oil absorption has increased at least 10 per cent.

11. The pigment prepared according to claim 2.

12. The pigment prepared according to claim 3.

LADISLAUS BALASSA.